United States Patent
Krafczyk et al.

(10) Patent No.: US 12,146,892 B2
(45) Date of Patent: Nov. 19, 2024

(54) SAMPLE TUBE RACK AND SAMPLE TUB RACK ASSEMBLY

(71) Applicant: Beckman Coulter, Inc., Brea, CA (US)

(72) Inventors: Thomas Krafczyk, Munich (DE); Martin Müller, Schliersee-Neuhaus (DE)

(73) Assignee: Beckman Coulter, Inc., Brea, CA (US)

( * ) Notice: Subject to any disclaimer, the term of this patent is extended or adjusted under 35 U.S.C. 154(b) by 889 days.

(21) Appl. No.: 17/258,387

(22) PCT Filed: Jul. 4, 2019

(86) PCT No.: PCT/IB2019/055725
§ 371 (c)(1),
(2) Date: Jan. 6, 2021

(87) PCT Pub. No.: WO2020/008413
PCT Pub. Date: Jan. 9, 2020

(65) Prior Publication Data
US 2021/0293839 A1    Sep. 23, 2021

(30) Foreign Application Priority Data
Jul. 6, 2018    (EP) ..................................... 18182101

(51) Int. Cl.
*B01L 9/06*    (2006.01)
*G01N 35/00*    (2006.01)
*G01N 35/04*    (2006.01)

(52) U.S. Cl.
CPC ................ *G01N 35/04* (2013.01); *B01L 9/06* (2013.01); *G01N 35/0099* (2013.01);
(Continued)

(58) Field of Classification Search
CPC .... B01L 9/06; B01L 35/099; B01L 2200/025; B01L 2200/028; B01L 2200/18;
(Continued)

(56) References Cited

U.S. PATENT DOCUMENTS

| 6,123,205 A | 9/2000 | Dumitrescu et al. |
| 2014/0326082 A1* | 11/2014 | Hirama ..................... G01N 1/00 73/863.92 |

(Continued)

FOREIGN PATENT DOCUMENTS

| EP | 2098296 A1 * | 9/2009 | ................ B01L 9/06 |
| EP | 3167962 A1 | 5/2017 | |
| WO | WO-0128680 A2 | 4/2001 | |

OTHER PUBLICATIONS

"European Application Serial No. 18182101.8, Extended European Search Report mailed Jan. 17, 2019", 9 pgs.

*Primary Examiner* — Jill A Warden
*Assistant Examiner* — Michael Stanley Gzybowski
(74) *Attorney, Agent, or Firm* — FROST BROWN TODD LLP

(57) ABSTRACT

A sample tube rack (10) for receiving at least one sample tube is provided, comprising: a bottom surface (12) comprising at least one opening (14) for receiving the sample tube, and at least two guiding elements (16, 16', 16a-d) arranged on the bottom surface (12) adjacent to the opening (14), wherein each guiding element (16, 16', 16a-d) extends substantially parallel to a vertical axis (18) of the opening (14) from the bottom surface (12) towards a top side (20) of the sample tube rack (10). The guiding elements (16, 16', 16a-d) are arranged at different positions (17a-d) around the opening (14), such that a tube compartment (24) for receiving the sample tube is formed by the guiding elements (16, 16', 16a-d) and the opening (14), wherein the guiding elements (16, 16', 16a-d) are spaced apart from each other (Continued)

along a perimeter (21) of the opening (14), thereby forming at least two clearances (22) between the guiding elements (16, 16', 16*a-d*) along the perimeter (21) of the opening (14).

18 Claims, 7 Drawing Sheets

(52) U.S. Cl.
CPC ... *B01L 2200/025* (2013.01); *B01L 2200/028* (2013.01); *B01L 2200/18* (2013.01); *B01L 2300/0829* (2013.01); *B01L 2300/0851* (2013.01); *B01L 2300/0858* (2013.01); *B01L 2300/123* (2013.01); *G01N 2035/041* (2013.01)

(58) Field of Classification Search
CPC ..... B01L 2300/0829; B01L 2300/0851; B01L 2300/0858; B01L 2035/041; G01N 35/04
See application file for complete search history.

(56) References Cited

U.S. PATENT DOCUMENTS

2016/0318660 A1 11/2016 Wissner et al.
2017/0136467 A1* 5/2017 Johns .................... G01N 35/04

* cited by examiner ially, the
SAMPLE TUBE RACK AND SAMPLE TUB RACK ASSEMBLY

CROSS-REFERENCE TO RELATED APPLICATION

This application is a U.S. National Stage Filing under 35 U.S.C. 371 from International Application No. PCT/IB2019/055725, filed on Jul. 4, 2019, and published as WO 2020/008413 on Jan. 9, 2020, which application claims priority to EP application Ser. No. 18/182,101.8, filed Jul. 6, 2018, which applications are incorporated herein by reference in their entirety.

FIELD OF THE INVENTION

The invention relates to a sample tube rack for receiving one or more sample tubes. The invention further relates to a sample tube rack assembly comprising such sample tube rack and to a method for inserting a sample tube into and/or removing a sample tube from such sample tube rack. Moreover, the invention relates to the use of the sample tube rack in a transport system for transporting and/or distributing sample tubes to one or more processing sites.

BACKGROUND OF THE INVENTION

Sample tube racks are commonly used, e.g. in laboratories, for receiving, holding and/or aligning one or more sample tubes. The sample tubes may, for instance, contain biological sample material or specimen which can be analyzed by means of dedicated analyzers or analyzing systems. Typical examples of such analyzers are tissue analyzers for analyzing tissue samples, urine analyzers for analyzing urine samples and hematology analyzers for analyzing blood samples or other body fluids.

In a typical laboratory workflow various different samples or sample types stored in a plurality of sample tubes are analyzed by means of different types of analyzers at different processing sites in the laboratory. For transporting the sample tubes and the sample material contained therein to the correct analyzer or processing site, usually an automatic transport system is utilized. Such transport system may comprise an input area or receiving section, where one or more sample tubes can be stored in one or more sample tube racks or sample tube rack assemblies, e.g. by an operator. The transport system may comprise e.g. an automatic distributor with a gripper or any other appropriate means allowing to pick a single sample tube from a sample tube rack and place this sample tube into another sample tube rack, which is sometimes referred to as distribution rack. This allows to pre-sort or sort the sample tubes, thereby ensuring an efficient distribution and transport of the sample tubes to the correct analyzer or processing site.

Generally, it may be favorable to precisely position and/or place the sample tubes in the sample tube rack in order to allow for a correct handling of the sample tubes by any component of the transport system, such as e.g. an analyzer.

SUMMARY OF THE INVENTION

It may therefore be desirable to provide for an improved sample tube rack, allowing to precisely position, align and/or hold one or more sample tubes therein. Particularly, embodiments of the present invention may allow for a precise positioning of one or more sample tubes in the sample tube rack by means of an automatic or semi-automatic transport system for transporting and/or distributing sample tubes, e.g. to processing sites and/or analyzers.

This is achieved by the subject-matter of the independent claims, wherein further embodiments are incorporated in the dependent claims and the following description.

A first aspect of the invention relates to a sample tube rack for receiving at least one sample tube, preferably a plurality of sample tubes. The sample tube rack comprises a bottom surface and/or a bottom area comprising at least one opening for receiving the sample tube and/or at least a part thereof. The sample tube rack further comprises at least two guiding elements arranged on the bottom surface adjacent to and/or in a vicinity of the at least one opening, wherein each guiding element extends substantially parallel to a vertical axis of the opening from the bottom surface towards and/or in direction of a top side of the sample tube rack. The top side of the sample tube rack may be arranged opposite to the bottom surface of the sample tube rack. The guiding elements are arranged at different positions around the opening, such that a tube compartment for receiving the sample tube is formed by the guiding elements and the opening. Further, the guiding elements are spaced apart from each other along a perimeter and/or a circumference of the opening, thereby forming at least two clearances between the guiding elements along the perimeter and/or the circumference of the opening. Therein, each clearance is formed and/or configured for receiving a gripper finger of a gripper for inserting the sample tube into and/or for removing the sample tube from the tube compartment.

By arranging the at least two guiding elements at different positions on the bottom surface and spaced-apart from each other along the perimeter of the opening, it can advantageously be ensured that one or more gripper fingers of the gripper can be moved at least partly from the top side of the sample tube rack into the clearances and/or at least partly into an interior portion of the sample tube rack, such that the sample tube can be precisely positioned in the tube compartment, e.g. at a predefined position, height and/or depth within the sample tube rack. The gripper may for instance be part of a transport system, a distributer and/or a distribution system for transporting and/or distributing the sample tube to a processing site and/or analyzer.

Generally, the opening may have an arbitrary shape or cross section. For instance, the opening may have a triangular, a quadratic, a polygonal, a round, an oval, an elliptical and/or any other shape or cross-section. The vertical axis may denote a vertical axis through a center of the opening. Therein, "vertical" may refer to a vertical direction in the Earth's gravitational field. The vertical axis of the opening may also refer to and/or be substantially parallel to an axis of symmetry of the opening.

The at least two guiding elements may have an arbitrary shape allowing to at least partly align, position and/or hold the sample tube in the tube compartment. Specifically, the at least two guiding elements may be shaped such that the sample tube is aligned substantially parallel to the vertical axis of the opening and/or such that the sample tube is positioned in an upright position in the tube compartment. The at least two guiding elements may for example be shaped corresponding to a shape of the opening and/or corresponding to a shape of the sample tube. For instance, the guiding elements may have a curved, curvilinear, arched, pillar-like, triangular, polygonal, elongated, column-like and/or any other shape. A bottom end of each guiding element may be arranged on, fixed to and/or attached to the bottom surface. Each guiding element may, for example, be arranged at a different position of an edge, a border, an outer circumference, a circumference, a perimeter, and/or a rim of the opening. Each of the guiding elements may adjoin the opening. A top end of each guiding element, opposite to the bottom end, may extend towards the top side of the sample tube rack. The top end of each guiding element may be arranged between the bottom surface and the top side of the sample tube rack. The top ends of the guiding elements may also be flush with the top side of the sample tube rack and/or the top ends of the guiding elements may at least partly define the top side of the sample tube rack. The guiding elements may have identical lengths, dimensions and/or shapes or they may have different lengths, dimensions and/or shapes. The guiding element can have arbitrary lengths, e.g. ranging from several millimeters to several tens of centimeters.

The at least two clearances may refer to an obstacle-free area, cavity, gap, region and/or portion of the sample tube rack. Particularly, each of the clearances may be accessible via the top side of the sample tube rack, e.g. accessible for the gripper fingers of the gripper. Accordingly, each of the clearances may be arranged at least partly in an interior portion and/or an interior volume of the sample tube rack (parallel to the vertical axis) between the top side and the bottom surface of the sample tube rack. Further, each clearance is arranged between the two neighboring guiding elements. Each clearance may, for example, extend between two guiding elements towards the vertical axis and/or adjoin the opening. Each clearance may be connected to at least a part of the opening and/or at least a part of the tube compartment. Each of the clearances may be defined and/or bordered by at least a part of the bottom surface and at least a part of the at least two guiding elements.

The invention can be considered as being based on the following findings and/or insights. Conventional sample tube racks usually have a closed top surface or top side, in which one or more openings and/or one or more tube compartments for receiving one or more sample tubes are arranged. Sample tubes usually should be placed and/or positioned at a predefined position, depth and/or height in the respective tube compartments. The depth and/or height may be measured parallel to and/or along the vertical axis. If a sample tube is not positioned at this predefined position, depth and/or height, a top end of the sample tube may protrude further away from the top side or top surface compared to a sample tube that was positioned at the correct position, depth and/or height. Accordingly, a gripper removing or picking the incorrectly positioned sample tube from the respective tube compartment may pick and/or grip the sample tube closer to a bottom end of the sample tube compared to a correctly positioned sample tube. If this sample tube is then transferred to another conventional sample tube rack having a closed surface, the gripper may crash with the top surface in the attempt to place the sample tube at the predefined position, depth and/or height in this sample tube rack. Accordingly, due to the closed top surface the gripper may not be able to correctly place the sample tube in the tube compartment, which may adversely affect the further handling of the sample tube, particularly downstream the gripper in a transport system.

In contrast to conventional sample tube racks having a closed top surface or top side, the sample tube rack according to the invention advantageously facilitates a gripper holding a sample tube to be at least partly moved through the top side, into the clearances towards the bottom surface such that each gripper finger may at least partly be arranged in one of the clearances between the top side and the bottom surface. This may allow the gripper to move at least partly into the interior volume of the sample tube rack. In other words, by means of the clearances, the gripper can at least partly dive into the sample tube rack. In turn, this facilitates the sample tube to be positioned and/or placed at the predefined position, depth and/or height in the tube compartment. Once the sample tube is correctly positioned in the tube compartment, the gripper fingers can be opened, e.g. moved away from each other, within the clearances, thereby releasing the sample tube. The sample tube rack according to the invention may, thus, advantageously be utilized as a distribution rack, e.g. in a transport system, distributer and/or distribution system. However, the sample tube rack may also be utilized for any other purpose and/or in any other section or area of a laboratory, such as e.g. an input section, a storing section or the like.

According to an embodiment of the invention, each clearance extends from the bottom surface to the top side of the sample tube rack. Alternatively or additionally, each clearance is open to the top side of the sample tube rack. Accordingly, each clearance may be outwardly open with respect to the top side of the sample tube rack, such that each clearance is accessible from the top side. Particularly, each clearance may be at least partly formed in the top side. In other words, each clearance may form a gap, cavity, opening and/or breakthrough in the top side of the sample tube rack. This may allow a gripper and/or a gripper finger to be moved at least partly through the top side and/or at least partly into the clearances, particularly without crashing with the top side or top surface of the sample tube rack. Accordingly, each clearance may be formed between the bottom surface, the guiding elements and the top side, wherein each clearance may be outwardly open in a direction of a surface normal vector of the top side.

According to an embodiment of the invention, each guiding element has an elongated and/or a columnar shape. This may ensure that the sample tube can be effectively aligned, positioned and/or held by the at least two guiding elements within the tube compartment. As noted above, however, the invention is not restricted to such shapes or forms of the guiding elements, but rather any other suitable shape of the guiding elements is conceivable, as will be further elucidated hereinafter.

According to an embodiment of the invention, each guiding element is configured for aligning and/or laterally holding the sample tube in a partial region of the sample tube, particularly only in a partial region of the sample tube. Alternatively or additionally, each guiding element is configured for laterally contacting a partial region of the sample tube, particularly only a partial region. It is to be noted that the guiding elements may only temporarily contact and/or hold the sample tube, e.g. during placement of the sample tube into the tube compartment. By way of example, while the sample tube is being inserted into the tube compartment, each guiding element may temporarily contact a partial region or portion, e.g. a lateral portion, of the sample tube, thereby aligning the sample tube e.g. with the vertical axis of the opening. Once the sample tube is aligned, the guiding elements may not contact the sample tube anymore. However, one or both of the guiding elements may also permanently contact a partial region of the sample tube, when the sample tube is arranged in the tube compartment. This may ensure that the sample tube is precisely aligned, securely held and/or positioned in the tube compartment.

According to an embodiment of the invention, each guiding element comprises at least one restraining element configured for holding the sample tube in the tube compartment, wherein at least a part of each restraining element extends and/or protrudes from the respective guiding element towards the vertical axis of the opening and/or the vertical axis through the center of the opening. Each restraining element may at least partly extend into the tube compartment. The restraining elements may be arbitrarily shaped or formed. The restraining elements may, for example, refer to protrusions protruding from the respective guiding element towards the vertical axis of the opening.

According to an embodiment of the invention, each restraining element or at least a part thereof is elastic, elastically deformable and/or flexible. Particularly, at least a part of each restraining element may be movable in direction of the respective guiding element and/or away from the vertical axis of the opening. This may allow to insert sample tubes of different shapes and/or sizes into the tube compartment, while also ensuring that the sample tubes are securely positioned and/or held in the tube compartment. When the sample tube is placed in the tube compartment, the restraining elements may exert a lateral force onto the sample tube, particularly a force towards and/or in direction of the vertical axis, thereby centering and/or holding the sample tube in the tube compartment. A guiding element and the respective restraining element may be formed as a single part. Alternatively, a restraining element may be attached and/or fixed to at least a part of the respective guiding element. The restraining elements and the guiding elements may be manufactured from the same material or they may be manufactured from different materials.

According to an embodiment of the invention, an end of each restraining element is attached to a top end of the respective guiding element, which top end is arranged opposite to the bottom surface. Alternatively or additionally, at least a part of each restraining element extends from a top end of the respective guiding element towards the bottom surface and towards the vertical axis of the opening, such that at least a part of each restraining element is inclined with respect to the vertical axis of the opening.

According to an embodiment of the invention, the sample tube rack comprises at least three guiding elements, preferably at least four guiding elements, which are arranged around the at least one opening at different positions and which are spaced apart from each other along the perimeter and/or circumference of the opening. In this embodiment at least three, preferably at least four, clearances are formed between the guiding elements along the perimeter and/or circumference of the opening. Also more than three and/or more than four guiding elements may be arranged around the opening. This may allow to securely align, position and/or hold the sample tube in the tube compartment.

According to an embodiment of the invention, the sample tube rack further comprises a side wall enclosing the bottom surface along a perimeter and/or a circumference of the bottom surface. The side wall may extend from the bottom surface to the top side of the sample tube rack. By means of the side wall, an overall robustness of the sample tube rack may be increased. Also, sample tubes stored in the sample tube rack may be protected against a lateral access.

According to an embodiment of the invention, the sample tube rack comprises a plurality of openings arranged in an array in the bottom surface. The array may, for example, comprise one or more rows and one or more columns. The array may also be referred to as an array of openings hereinafter. The sample tube rack further comprises a plurality of guiding elements, wherein the openings and the guiding elements are alternately arranged along a row and/or along a column of the array. Accordingly, the array of openings and the plurality of guiding elements may form an array of tube compartments for receiving a plurality of sample tubes.

According to an embodiment of the invention, the guiding elements of the plurality of guiding elements, which are arranged between two neighboring openings in a row or between two neighboring openings in a column of the array, comprise at least two restraining elements arranged on two opposite sides of the respective guiding element. Therein, each of the restraining elements arranged on a single guiding element may extend at least partly from the guiding element towards a vertical axis of a different opening. In other words, a first restraining element may extend at least partly from the guiding element towards a vertical axis of a first opening arranged adjacent to the guiding element, and a second restraining element may extend at least partly from the guiding element towards a vertical axis of a second opening arranged adjacent to the guiding element. Therein, the first and second openings may be arranged on two opposite sides of the respective guiding element. Generally, such embodiment may allow to provide a compact sample tube rack allowing to store many sample tubes in a space-saving manner.

According to an embodiment of the invention, guiding elements of the plurality of guiding elements, which are arranged at a perimeter of the array, are at least partly attached to a side wall of the sample tube rack. This may allow to increase a robustness and stability of the sample tube rack.

According to an embodiment of the invention, the sample tube rack is injection molded. Particularly, the sample tube rack may be formed as a single part in an injection molding process. Accordingly, the sample tube rack may be manufactured in a cost-efficient manner. The sample tube rack may, for example, be manufactured from plastic material, reinforced plastic material, fiber-reinforced material thermoplastic material and/or thermoset plastic material. It should be noted, however, that the invention is not restricted to injection molding or to any of the above materials. Particularly, the sample tube rack or a part thereof may be manufactured from metal, e.g. in a casting process.

A second aspect of the present invention relates to the use of a sample tube rack, as described hereinabove and hereinafter, in a transport system for transporting and/or distributing sample tubes, e.g. to processing sites and/or analyzers.

A third aspect of the invention relates to a sample tube rack assembly. The sample tube rack assembly comprises an upper part with at least one sample tube rack, as described hereinabove and hereinafter. Therein, the sample tube rack may form the upper part. The sample tube rack assembly further comprises a lower part comprising a supporting surface with at least one supporting position for supporting the sample tube, wherein the upper part is arranged on top of the lower part, such that the at least one opening of the at least one sample tube rack of the upper part is substantially aligned with the at least one supporting position of the lower part. The vertical axis of the opening of the sample tube rack of the upper part may be substantially aligned with a center of the supporting position. The upper part and the lower part may be formed as a single part or as multiple parts.

For instance, the upper part and the lower part may be attached to each other by means of a snap fit, a plug connection and/or by means of one or more connecting features. The upper part and the lower part may be releasably attached to each other.

The supporting position may comprise a recess, which may be substantially convergent, particularly substantially conically convergent, towards a bottom side of the sample tube rack assembly, e.g. along the vertical axis of the opening of the sample tube rack of the upper part. The supporting position and/or the recess of the supporting position may be shaped corresponding to a shape of a bottom end of the sample tube. This may ensure precise alignment and/or a secure positioning of the sample tube in the sample tube rack assembly.

It is emphasized that any feature, element and/or function, which is described hereinabove and hereinafter with reference to one aspect of the invention, equally applies to any other aspect of the invention, as described hereinabove and hereinafter.

Particularly, features, elements and/or functions, as described hereinabove and hereinafter with reference to the sample tube rack according to the first aspect, equally apply to the use of the sample tube rack according to the second aspect and/or to the sample tube rack assembly according to the third aspect, and vice versa.

According to an embodiment of the invention, the sample tube rack assembly further comprises an intermediate part comprising an intermediate surface with at least one intermediate opening. The intermediate part is arranged and/or stacked between the upper part and the lower part, such that the at least one opening of the at least one sample tube rack of the upper part is aligned with the at least one intermediate opening and with the at least one supporting position of the lower part. Accordingly, the vertical axis of the opening of the sample tube rack of the upper part may be substantially parallel to and/or substantially aligned with a vertical axis of the intermediate opening. The vertical axis of the opening and/or the vertical axis of the intermediate opening may further be substantially aligned with a center of the supporting position of the lower part.

The intermediate part may comprise a further sample tube rack, as described hereinabove and hereinafter. The further sample tube rack may form the intermediate part. Accordingly, the intermediate part and the upper part may be identical in construction. The sample tube rack of the upper part and the further sample tube rack of the intermediate part may be stacked on top of each other and/or stacked on top of the lower part.

According to an embodiment of the invention, the intermediate part and the upper part differ from another in construction. By way of example, the intermediate part may comprise an intermediate sample tube rack differing in construction and/or design with respect to the sample tube rack of the upper part, as will be discussed in detail hereinafter.

According to a fourth aspect of the invention, there is provided a method for inserting a sample tube into and/or removing a sample tube from a sample tube rack, as described hereinabove and hereinafter, and/or a sample tube rack assembly, as described hereinabove and hereinafter. The method comprises the following steps:

moving a gripper having a plurality of gripper fingers for holding the sample tube towards the bottom surface of the sample tube rack, such that each gripper finger is at least partly arranged in one of the clearances formed between the guiding elements of the sample tube rack; and inserting the sample tube into the tube compartment or removing the sample tube from the tube compartment based on actuating the gripper and/or the gripper fingers of the gripper.

Features, elements and/or functions, as described hereinabove and hereinafter with reference to the sample tube rack and/or the sample tube rack assembly, equally apply to steps, features, functions and/or elements of the method as described hereinabove and hereinafter, and vice versa.

These and other aspects of the invention will be apparent from and elucidated with reference to the embodiments described hereinafter.

BRIEF DESCRIPTION OF THE DRAWINGS

The subject-matter of the invention will be explained in more detail in the following with reference to exemplary embodiments which are illustrated in the attached drawings, wherein.

In principle, identical or like parts are provided with identical or like reference symbols in the figures.

DETAILED DESCRIPTION OF EXEMPLARY EMBODIMENTS

Figure 1A:
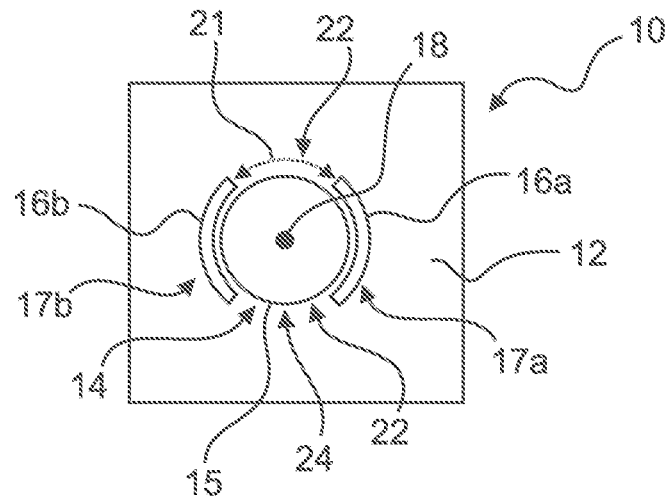
FIG. 1A shows schematically a top view of a sample tube rack according to an exemplary embodiment of the invention.
Figure 1B:
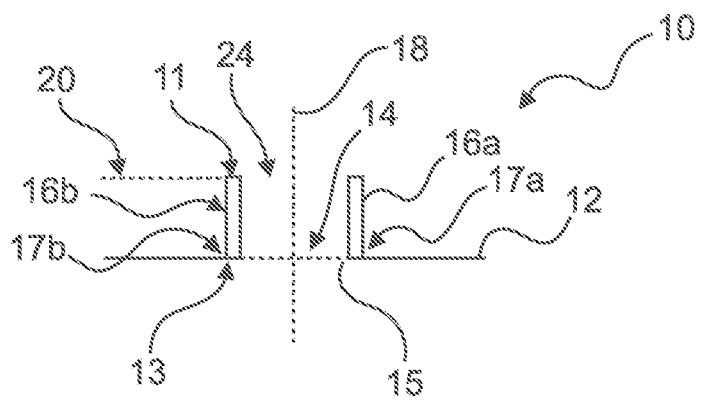
FIG. 1B shows schematically a cross-sectional view of the sample tube rack of FIG. 1A.

FIG. 1A shows schematically a top view of a sample tube rack 10 according to an exemplary embodiment of the invention. FIG. 1B shows schematically a cross-sectional view of the sample tube rack 10 of FIG. 1A.

The sample tube rack 10 comprises a bottom surface 12 with an opening 14. The opening 14 of the exemplary embodiment shown in FIGS. 1A and 1B has a round and/or circular shape. Alternatively, the opening 14 may have a triangular, a quadratic, a polygonal, an oval, an elliptic or any other shape. The opening 14 is configured for receiving a sample tube (not shown). Accordingly, the shape of the opening 14 may correspond to a shape of the sample tube.

The sample tube rack 10 further comprises at least two guiding elements 16a, 16b that are arranged on the bottom surface 12 adjacent to, in a vicinity of and/or neighboring the opening 14. The guiding elements 16a, 16b may for instance be arranged at an edge 15, border 15 and/or rim 15 of the opening 14 or they may be arranged spaced-apart therefrom. Specifically, a bottom end 13 of each of the guiding elements 16a, 16b is arranged on and/or fixed to the bottom surface 12. A top end 11 opposite to the bottom end 13 of each guiding elements 16a, 16b protrudes and/or extends from the bottom surface 12 towards a top surface 20 or top side 20, as indicated by a dashed line in FIG. 1B. Therein, the guiding elements 16a, 16b extend substantially parallel to a vertical axis 18 of the opening 14 and/or to a vertical axis 18 through a center of the opening 14. In the context of the present disclosure, "substantially parallel" may also comprise a slight inclination of the vertical axis 18 with respect to an extension direction of the guiding elements 16a, 16b. By way of example, the guiding elements 16a, 16b may form a conus converging towards the bottom surface 12.

The top side 20 may denote an upper end 20 or upper side 20 of the sample tube rack 10 opposite to the bottom surface 12. The top side 20 may be defined by the second ends 11 of the guiding elements 16a, 16b, as shown in FIG. 1B.

Each guiding element 16a, 16b is arranged at a different position 17a, 17b around the opening 14. In the example shown in FIGS. 1A and 1B, guiding element 16a is arranged at position 17a and guiding element 16b is arranged at position 17b on an opposite side of the opening 14. Generally, the guiding elements 16a, 16b may at least partly encompass the opening 14. As can be seen in FIG. 1A, each of the guiding elements 16a, 16b is arc-like or curved shape. In other words, each guiding element 16a, 16b is curved around a part of the opening 14. The guiding elements 16a, 16b and the opening 14 together form a tube compartment 24, in which a sample tube can be placed, received and/or held.

Further, the guiding elements 16a, 16b are spaced apart from each other along a perimeter and/or circumference 21 of the opening 14, as indicated by the arrow 21 in FIG. 1A. Due to this spacing of the guiding elements 16a, 16b two clearances 22 and/or gaps 22 are formed between the guiding elements 16a, 16b along the perimeter and/or circumference 21 of the opening 14. Each clearance 22 may adjoin the opening 14. Generally, the clearances 22 allow to precisely insert, place and/or introduce the sample tube into the tube compartment 24 at a predefined position, depth and/or height in the tube compartment 24. Particularly, each of the clearances 22 is configured and/or formed for receiving at least one gripper finger 152 of a gripper 150 (not shown; see FIG. 8E) for inserting the sample tube into and/or for removing the sample tube from the tube compartment 24. Therein, each clearance 22 is accessible from the top side 20 of the sample tube rack 10 and/or is open to the top side 20 of the sample tube rack 10, such that the gripper fingers 152 can be at least partly moved via the top side 20 towards the bottom surface 12 into an interior volume and/or an interior portion of the sample tube rack 10, which interior volume and/or the interior portion is arranged between the bottom surface 12 and the top side 20 of the sample tube rack 10. Accordingly, the gripper fingers 152 of the gripper 150 may at least partly dive into the sample tube rack 10, such that the sample tube can be placed and/or positioned at a predefined position, depth and or height in the tube compartment 24.

The guiding elements 16a, 16b may serve to align and/or at least partially align a sample tube with respect to the vertical axis 18. For instance, a longitudinal axis of the sample tube may be aligned by means of the guiding elements 16a, 16b with the vertical axis 18. Particularly, the guiding elements 16a, 16b may serve to align and/or at least partially align the sample tube while the sample tube is inserted into the tube compartment 24. For instance, the guiding elements 16a, 16b may at least temporarily contact a lateral part of the sample tube while the sample tube is inserted into the tube compartment 24, such that the sample tube is at least partially aligned. However, the guiding elements 16a, 16b may also permanently contact a lateral part of the sample tube, when the sample tube is placed and/or arranged in the tube compartment 24.

Figure 2:
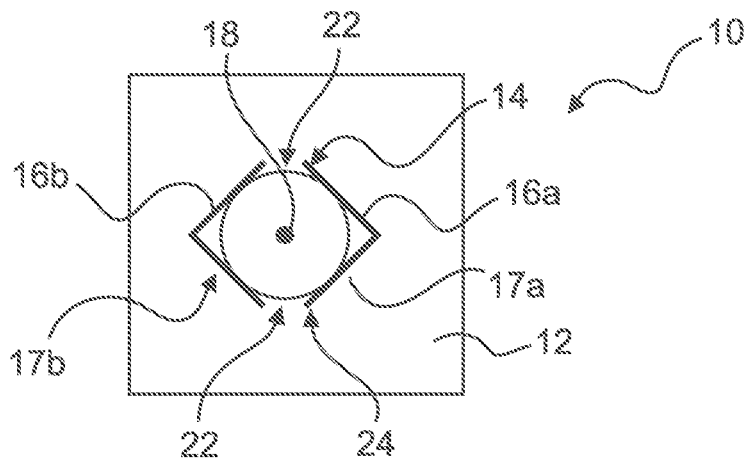
FIGS. 2 to 5 each show schematically a top view of a sample tube rack according to exemplary embodiments of the invention.

FIG. 2 shows schematically a top view of a sample tube rack 10 according to an exemplary embodiment of the invention. If not stated otherwise, the sample tube rack 10 of FIG. 2 comprises the same elements, features and/or functions as the sample the rack 10 of FIGS. 1A and 1B.

In contrast to the sample tube rack 10 of FIGS. 1A and 1B, the guiding elements 16a, 16b of the sample tube rack of FIG. 2 have a triangular shape. In other words, each guiding element 16a, 16b is formed as a triangle which is open towards the opening 14 and/or towards the vertical axis 18, such that a sample tube can at least partly be encompassed by the guiding elements 16a, 16b. Also the guiding elements 16a, 16b of FIG. 2 extend from the bottom surface 12 towards the top side 20 and are spaced apart from each other along the perimeter 21 of the opening 14 to form the clearances 22, as described with reference to FIGS. 1A and 1B.

Figure 3:
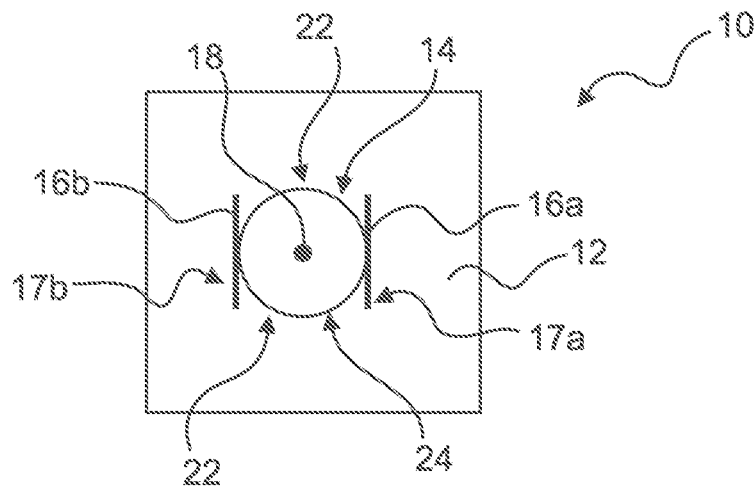

FIG. 3 shows schematically a top view of a sample tube rack 10 according to an exemplary embodiment of the invention. If not stated otherwise, the sample tube rack 10 of FIG. 3 comprises the same elements, features and/or functions as the sample the racks 10 described with reference to the foregoing figures.

In contrast to the sample tube racks 10 of the foregoing figures, the guiding elements 16a, 16b of the sample tube rack 10 of FIG. 3 are bar-like shaped. In other words, each guiding element 16a, 16b has a rectangular cross-section. Accordingly, each guiding element 16a, 16b is formed as a bar and the guiding elements 16a, 16b are arranged on two opposite sides of the opening 14, such that a sample tube can at least partly be arranged between the guiding elements 16a, 16b. Also the guiding elements 16a, 16b of FIG. 3 extend from the bottom surface 12 towards the top side 20 and are spaced apart from each other along the perimeter 21 of the opening 14 to form the clearances 22, as described with reference to the foregoing figures.

Figure 4:
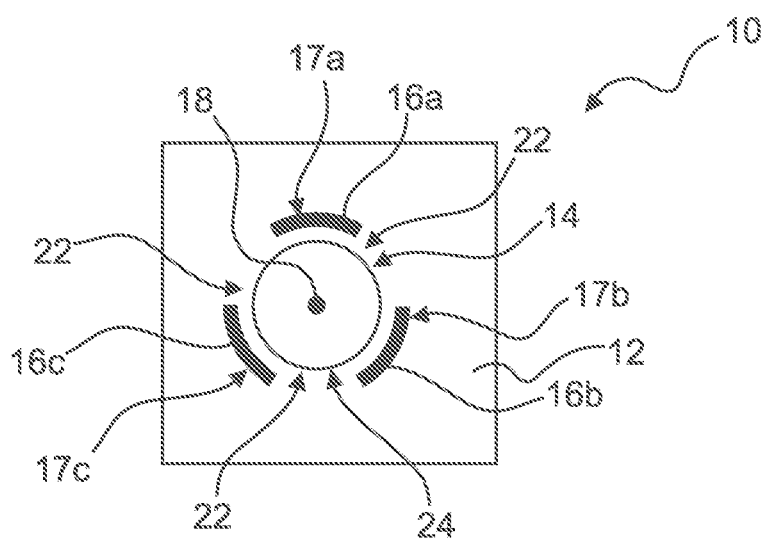

FIG. 4 shows schematically a top view of a sample tube rack 10 according to an exemplary embodiment of the invention. If not stated otherwise, the sample tube rack 10 of FIG. 4 comprises the same elements, features and/or functions as the sample the racks 10 described with reference to the foregoing figures.

In contrast to the sample tube racks 10 of the foregoing figures, the sample tube rack 10 of FIG. 4 comprises three guiding elements 16a-c which are arranged at different positions around the opening 14 and which are spaced apart from each other along the perimeter 21 of the opening 14, thereby forming three clearances 22 between the guiding elements 16a-c along the perimeter 21 of the opening 14. In the example shown in FIG. 4, each guiding element 16a-c has an arc-like or curved shape, such that each guiding element 16a-c partly encompasses the opening 14 and/or the tube compartment 24. Also the guiding elements 16a-c of FIG. 4 extend from the bottom surface 12 towards the top side 20, as described with reference to the foregoing figures.

Figure 5:
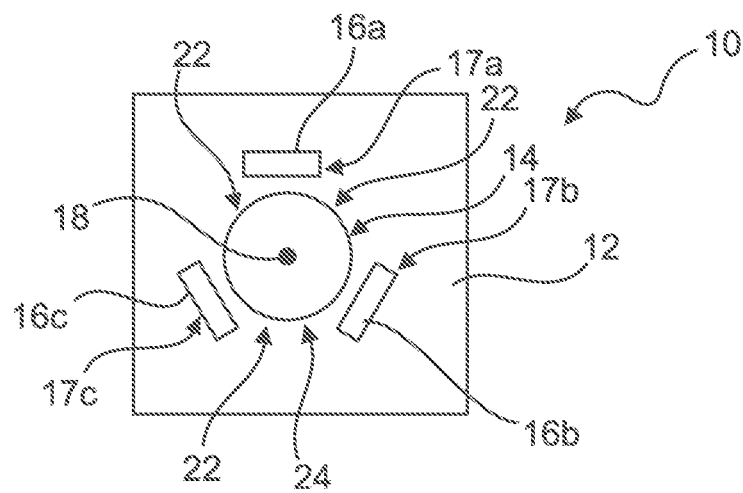

FIG. 5 shows schematically a top view of a sample tube rack 10 according to an exemplary embodiment of the invention. If not stated otherwise, the sample tube rack 10 of FIG. 5 comprises the same elements, features and/or functions as the sample the racks 10 described with reference to the foregoing figures.

Similar to the sample tube rack 10 of FIG. 4, the sample tube rack of FIG. 5 comprises three guiding elements 16a-c. The guiding elements 16a-c are bar-like shaped. In other words, each guiding element 16a-c has a rectangular cross-section. Accordingly, each guiding element 16a-c is formed as a bar and the guiding elements 16a-c are arranged different sides of the opening 14 and/or arranged at different positions around the opening 14, such that a sample tube can at least partly be arranged between the guiding elements 16a-c. Also the guiding elements 16a-c of FIG. 5 extend from the bottom surface 12 towards the top side 20 and are spaced apart from each other along the perimeter 21 of the opening 14, thereby forming three clearances 22 between the guiding elements 16a-c along the perimeter 21 of the opening 14, as described with reference to the foregoing figures.

Figure 6A:
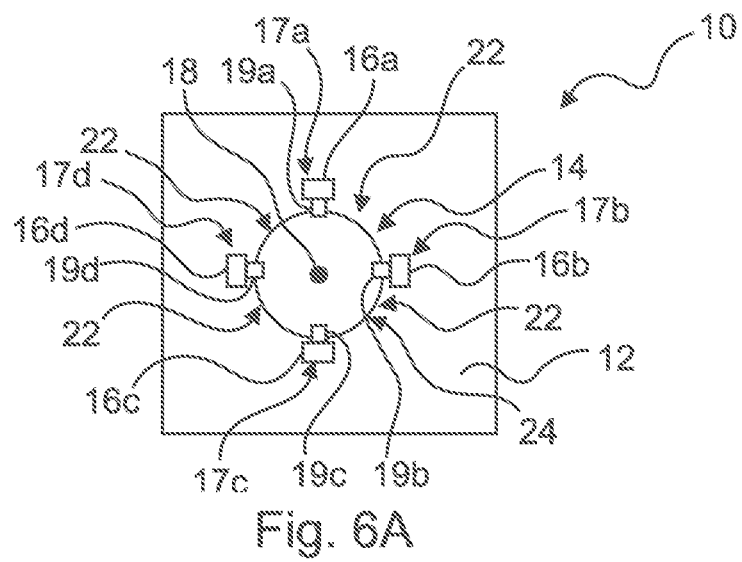
FIG. 6A shows schematically a top view of a sample tube rack according to an exemplary embodiment of the invention.
Figure 6B:
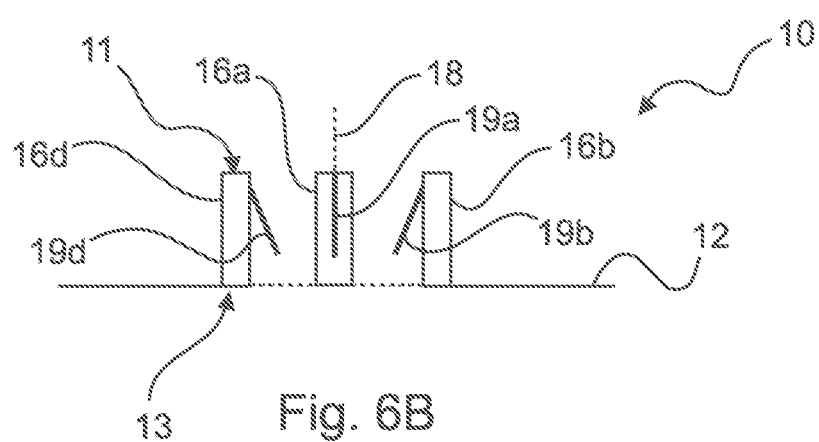
FIG. 6B shows schematically a cross-sectional view of the sample tube rack of FIG. 6A.

FIG. 6A shows schematically a top view of a sample tube rack 10 according to an exemplary embodiment of the invention. FIG. 6B shows schematically a cross-sectional view of the sample tube rack 10 of FIG. 6A. If not stated otherwise, the sample tube rack 10 of FIGS. 6A and 6B comprises the same elements, features and/or functions as the sample the racks 10 described with reference to the foregoing figures.

The sample tube rack of FIGS. 6A and 6B comprises four guiding elements 16a-d. The guiding elements 16a-c are pillar-like, elongated and/or column-like formed. In the example shown in FIGS. 6A and 6B, each guiding element 16a-d has a rectangular cross-section. However, any other cross-section is conceivable. Accordingly, each guiding element 16a-d is bar-like formed. Further, the guiding elements 16a-d are arranged on different sides of the opening 14 and/or arranged at different positions around the opening 14, such that a sample tube can at least partly be arranged between the guiding elements 16a-d in the opening 14 and/or the tube compartment 24. Also the guiding elements 16a-d of FIGS. 6A and 6B extend from the bottom surface 12 towards the top side 20 and are spaced apart from each other along the perimeter 21 of the opening 14, thereby forming four clearances 22 between the guiding elements 16a-d and/or between pairs of the guiding elements 16a-d along the perimeter 21 of the opening 14, as described with reference to the foregoing figures.

Each guiding element 16a-d comprises a restraining element 19a-d configured to align, position and/or hold the sample tube in the tube compartment 24. Each restraining element 19a-d is arranged on a side of the respective guiding element 16a-d facing the opening 14. Each restraining element 19a-d extends at least partly from the respective guiding element 16a-d towards the vertical axis 18 of the opening 14.

At least a part of each restraining element 19a-d is flexible, elastic, and/or deformable, such that at least a part of each restraining element 19a-d can be moved in direction of the guiding element 16a-d at which the respective restraining element 19a-d is arranged. In the example shown in FIGS. 6A and 6B, an end of each restraining element 19 is attached to the top end 11 of the respective guiding element 16a-d. Each restraining element 19a-d extends from the top end 11 of the respective guiding element 16a-d at least partly towards the bottom surface 12 and towards the vertical axis of the opening 14, such that at least a part of each restraining element 19a-d is inclined with respect to the vertical axis 18 of the opening 14. When a sample tube is placed into the tube compartment 24, each restraining element 19a-d can be pushed towards the respective guiding element 16a-d t which it is attached, such that the restraining elements 19a-d may contact the sample tube on different sides thereof; respectively. Hence, the restraining elements 19a-d may exert a centering force in direction of the vertical axis 18 onto the sample tube to center the sample tube in the tube compartment 24 and/or the opening 14. This may allow to place sample tubes of different shapes and/or sizes into the tube compartment 24 and securely position and/or hold the sample tubes in the tube compartment 24.

The sample tube racks 10 of FIGS. 1A to 6B exemplary only comprised one opening 14. The sample tube racks 10, however, may also comprise a plurality of openings 14 as described hereinafter.

Figure 7A:
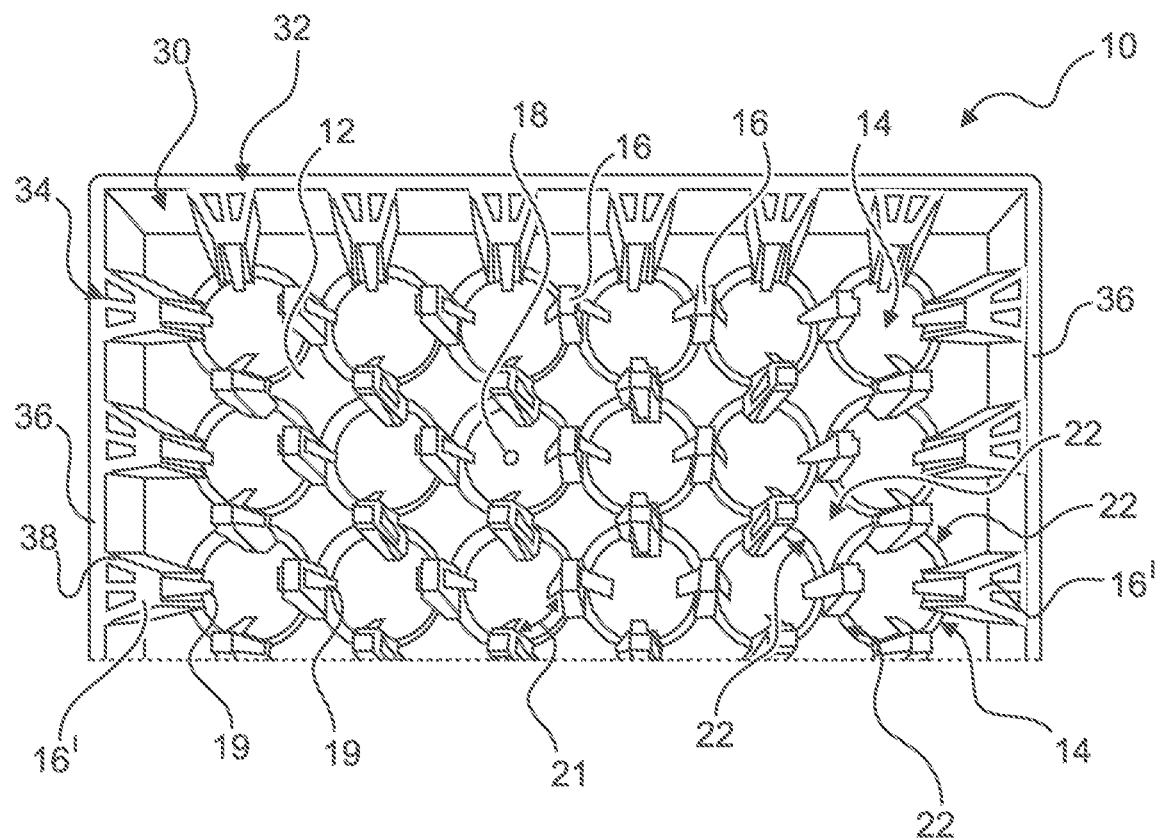
FIG. 7A shows schematically a top view of a sample tube rack according to an exemplary embodiment of the invention.
Figure 7B:
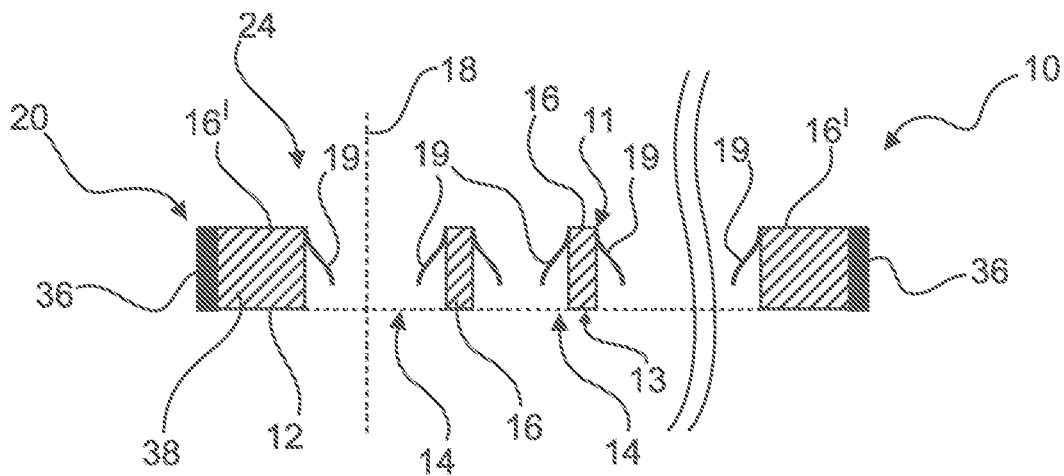
FIG. 7B shows schematically a cross-sectional view of a part of the sample tube rack of FIG. 7A.

FIG. 7A shows schematically a top view of a sample tube rack 10 according to an exemplary embodiment of the invention. FIG. 7B shows schematically a cross-sectional view of a part of the sample tube rack 10 of FIG. 7A. If not stated otherwise, the sample tube rack 10 of FIGS. 7A and 7B comprises the same elements, features and/or functions as the sample the racks 10 described with reference to the foregoing figures.

The sample tube rack 10 of FIGS. 7A and 7B comprises a plurality of openings 14. The openings 14 are arranged in an array 30 comprising a plurality of rows 32 and a plurality of columns 34, in which the openings 14 are arranged. In the example shown in FIGS. 7A and 7B, the array 30 comprises in total six rows 32 and three columns 34. However, any other number of rows 32 and columns 34 is conceivable. Alternatively, the openings 14 may be arranged in an arbitrary pattern.

Similar to the exemplary embodiment depicted in FIGS. 6A and 6B, each of the openings 14 is surrounded by four guiding elements 16, 16'. Specifically, four guiding elements 16, 16' are arranged adjacent to and/or around each opening 14. Also, subsets of four guiding elements 16, 16' arranged around a single opening 14 are spaced apart from each other along the perimeter 21 and/or circumference 21 of the respective opening 14, as indicated by the arrow 21. Accordingly, four clearances 22 are formed between the subset of four guiding elements 16, 16' along the perimeter 21 that are arranged around a single opening 14, i.e. one clearance 22 between two of the four guiding elements 16, 16', respectively. Therein, each guiding element 16, 16' around a single opening 14 is arranged at a different position and/or on a different side of the opening 14. Accordingly, two of the four guiding elements 16, 16' are arranged opposite to each other on two opposite sides of the opening 14, respectively.

In the example of FIGS. 7A and 7B, the (dashed) guiding element 16' are arranged along a perimeter and/or border of the array 30 of openings 14. Accordingly, the guiding elements 16' may denote outer guiding elements 16' of the sample tube rack 10. In contrast thereto, the (undashed) guiding elements 16 denote inner guiding elements 16 arranged within the array 30 of openings 14.

Along each row 32 and/or along each column 34 of the array 30, the openings 14 and the guiding elements 16, 16' are alternately arranged, thereby forming an array of tube compartments 24 for receiving a plurality of sample tubes.

Each of the guiding elements 16, 16' has an elongated shape, a pillar-like and/or column-like shape and extends from the bottom surface 12 towards the top side 20 of the sample tube rack 10. Further, each of the guiding elements 16, 16' has a rectangular cross-section.

Further, each of the guiding elements 16, 16' comprises at least one restraining element 19 attached with an end on a top end 11 of the respective guiding element 16, 16' and extending towards the bottom surface 12 and the vertical axis 18 of the respective opening 14, at which the respective restraining element 19 is facing, as described with reference to FIGS. 6A and 6B.

Each of the inner guiding elements 16 is arranged between two neighboring openings 14 in a row 32 or between two neighboring openings 14 in a column 34 of the array 30. Each of the inner guiding elements 16 comprises two restraining elements 19 arranged on two opposite sides thereof, such that each of the restraining elements 19 faces one of the two openings 14 between which the respective guiding element 16 is arranged. In contrast, each of the outer guiding elements 16' comprises only one restraining element 19 directed towards the respective opening 14. Generally, this allows for a compact and space-saving design of the sample tube rack 10.

The sample tube rack 10 further comprises a side wall 36 surrounding and/or encompassing the bottom surface 12 and/or the array 30 of openings 14. The side wall 36 may extend from the bottom surface 12 to the top side 20 of the sample tube rack 10. The sidewall 36 and the guiding elements 16, 16' may have identical or different lengths measured from the bottom surface 12 towards the top side 20 parallel to the vertical axis 18.

Each of the outer guiding elements 16' is attached and/or fixed to the side wall 36 via a protrusion 38 protruding from the side wall 36 towards the nearest opening 14 and/or the opening 14 that is arranged closest. The protrusions 38 have a conical cross-section converging towards the respective opening 14. However, any other cross-section is conceivable. On a side of each protrusion opposite the side wall 36 the respective guiding element 16' is arranged, such that the restraining element 16' is directed towards the opening 14. The restraining elements 19 and the outer guiding elements 16' can be manufactured from a single part or multiple parts. Moreover, also the protrusions 38 and the guiding elements 16' can be manufactured as a single part or multiple parts.

Similarly, the inner guiding elements 16 and the corresponding restraining elements 19 can be manufactured as a single or as multiple parts. Particularly, the entire sample tube rack 10 can be manufactured as a single part, e.g. in a molding and/or injection molding process.

In the example shown in FIGS. 7A and 7B clearances 22, which are arranged between directly neighboring openings 14 connect to each other to form a single clearance 22. For example, as can be seen in FIG. 7A, the clearances 22 arranged in the middle of a subset of four directly neighboring openings 14 are connected to each other, thereby forming a single connected clearance 22. Accordingly, gripper fingers 152 of a gripper 150 can be moved freely within the connected clearance 22, which reduces the risk of hitting parts of the sample tube rack 10 with the gripper 150. Generally, this may simplify and improve handling of the sample tube rack 10.

Figure 8A:
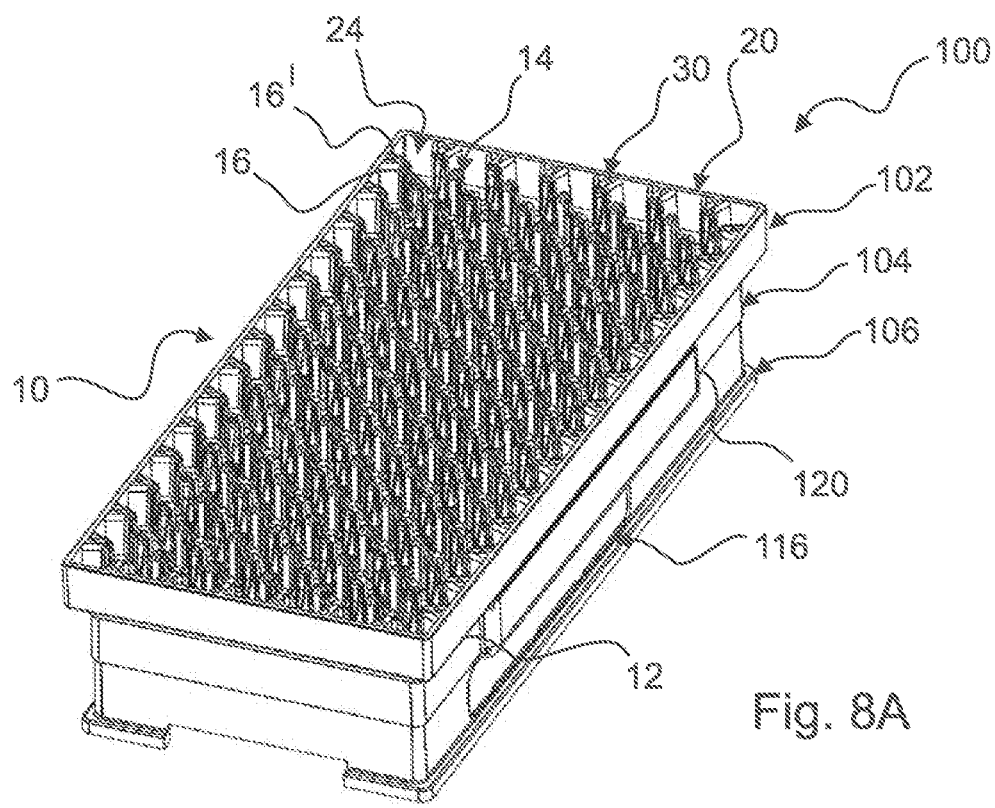
FIG. 8A shows schematically a perspective view of a sample tube rack assembly according to an exemplary embodiment.
Figure 8B:
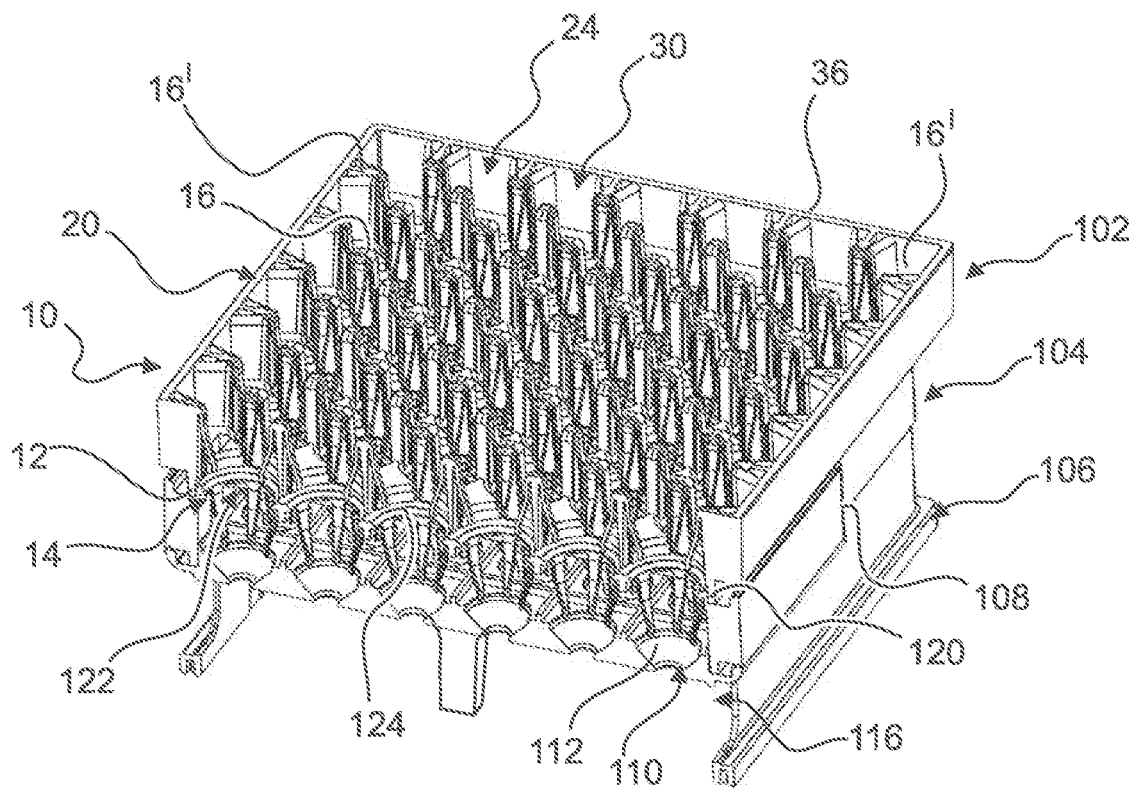
FIG. 8B shows schematically a perspective view of a cut through the sample tube rack assembly of FIG. 8A.
Figure 8C:
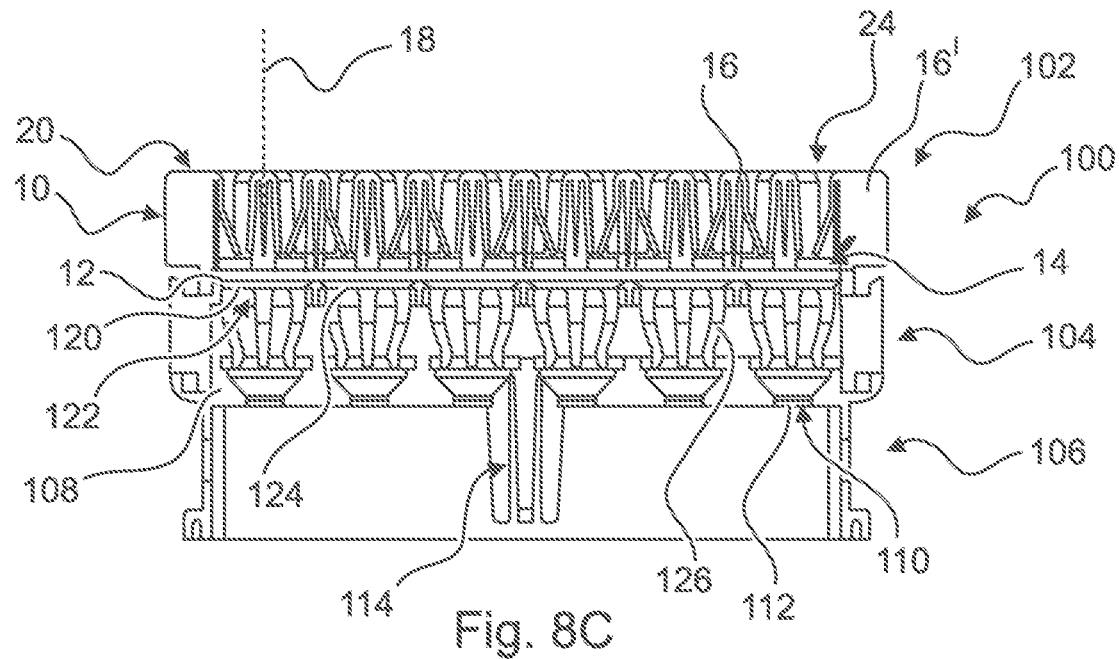
FIG. 8C shows schematically a cross-sectional front view of the sample tube rack assembly of FIG. 8A.
Figure 8D:
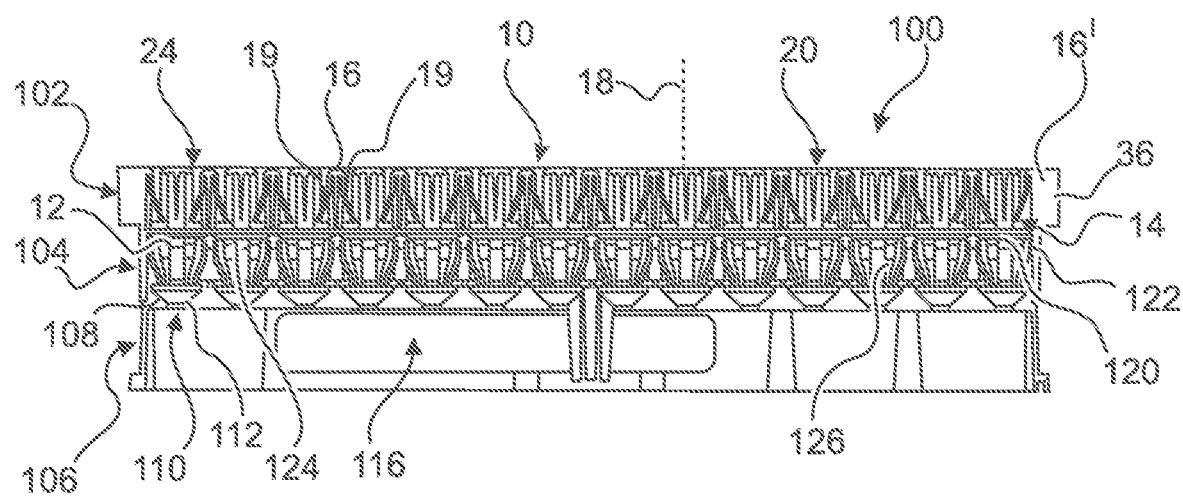
FIG. 8D shows schematically a cross-sectional side view of the sample tube rack assembly of FIG. 8A.
Figure 8E:
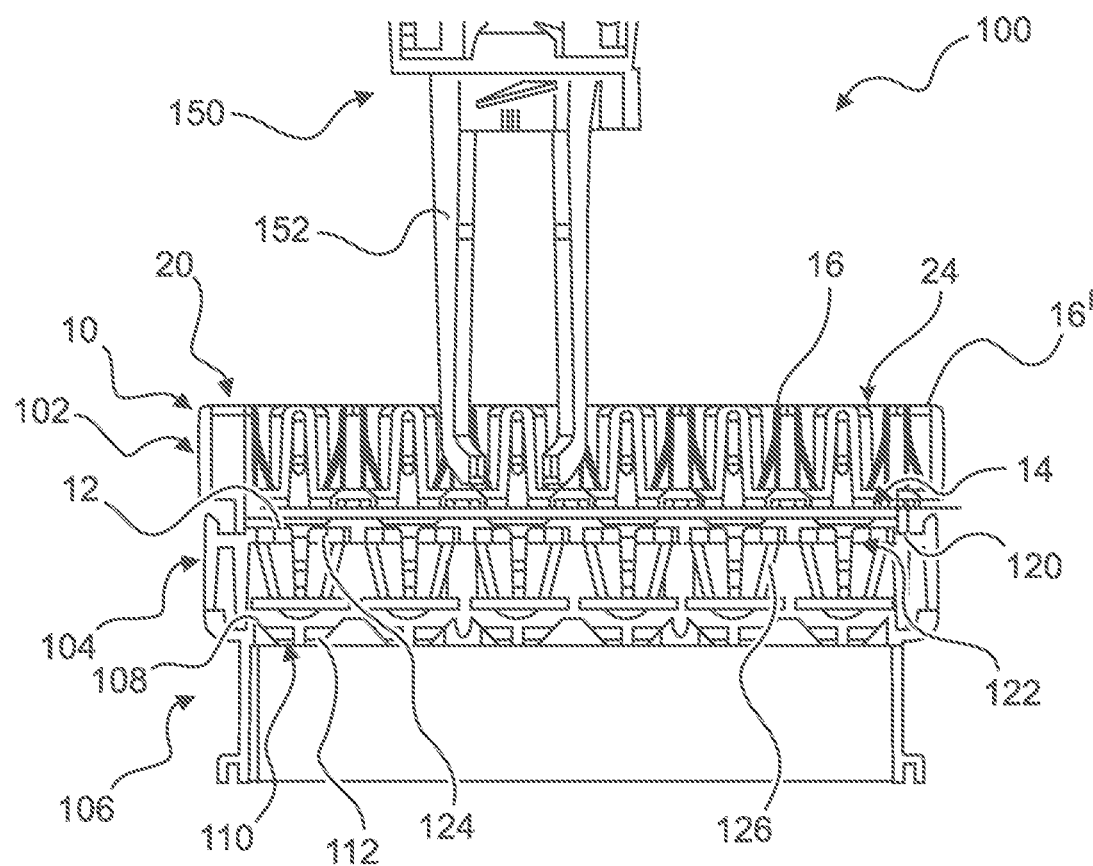
FIG. 8E shows schematically a cross-sectional front view of the sample tube rack assembly of FIG. 8A with a gripper.

FIG. 8A shows schematically a perspective view of a sample tube rack assembly 100 according to an exemplary embodiment. FIG. 8B shows schematically a perspective view of a cut through the sample tube rack assembly 100 of FIG. 8A, FIG. 8C shows schematically a cross-sectional front view of the sample tube rack assembly 100 of FIG. 8A, FIG. 8D shows schematically a cross-sectional side view of the sample tube rack assembly 100 of FIG. 8A, and FIG. 8E shows schematically a cross-sectional front view of the sample tube rack assembly 100 of FIG. 8A with a gripper 150.

The sample tube rack assembly 100 shown in FIGS. 8A to 8E comprise an upper part 102 with a sample tube rack 10, as described with reference to the foregoing figures. If not stated otherwise, the sample tube rack 10 of FIGS. 8A to 8E comprises the same elements, features and/or functions as the sample the racks 10 described with reference to the foregoing figures. Specifically, the sample tube rack 10 of FIGS. 8A to 8E corresponds to the embodiment of 7A and 7B. For details of the sample tube rack 10, it is thus referred to those figures.

The sample tube rack assembly 100 further comprises an intermediate part 104 and a lower part 106. It is to be noted, however, that the intermediate part 104 is optional only. The lower part 106, the intermediate part 104 and the upper part 102 are stacked on top each other. The intermediate part 104 can be attached to both the upper part 102 and the lower part 106, e.g. by means of a snap fit or the like. In the example shown in FIGS. 8A to 8E, the intermediate part 102 differs in construction from the upper part 102. Also this, however, is optional only. Alternatively, the intermediate part 104 can be identical in design compared to the upper part 102. Hence also the intermediate part 104 can comprise a sample tube rack 10 as described in the foregoing figures.

The lower part comprises a supporting surface 108 with a plurality of supporting positions 110 for supporting sample tubes. Each of the supporting positions 110 is aligned with one of the openings 14 and/or with a vertical axis 18 of one of the openings 14 of the sample tube rack 10 of the upper part 18. Each supporting position 110 comprises a recess 112 converging towards a bottom end of the sample tube rack assembly 100 opposite to the top side 20 of the upper part 102 or sample tube rack 10. By means of the recess 112, a sample tube can be precisely aligned with respect to the vertical axis 18 and can be securely positioned in the respective tube compartment 24.

The lower part 106 further comprises an RFID compartment 114 for receiving an RFID tag. The RFID tag may e.g. store information concerning the design of the sample tube rack assembly 100, such as the number of rows 32 and/or columns 34. The RFID tag may also store information about the sample tubes stored in the sample tube rack assembly 100.

The lower part 106 further comprises a gripping orifice 116 on either of two opposite lateral sides thereof. The gripping orifices 116 may facility save handling and manual transportation as well as placement and positioning of the sample tube rack assembly 100.

The intermediate part 104 comprises an intermediate surface 120 with a plurality of intermediate openings 122. Each of the intermediate openings 122 is aligned with one of the supporting positions 108 of the lower part 106, one of the openings 14 and/or with a vertical axis 18 of one of the openings 14 of the sample tube rack 10 of the upper part 18, thereby forming a tube compartment 24.

On a rim 124 of each intermediate opening 122 one or more intermediate restraining elements 126 are arranged. In the example shown in FIGS. 8A to 8E four intermediate restraining elements 126 are arranged on a rim 124 of one intermediate opening 124. Each of the intermediate restraining elements 126 protrudes from the respective rim 124 towards the vertical axis 18 and towards the bottom end of the sample tube rack assembly 100. The intermediate restraining elements 126 are analogue in design and function to the restraining elements 19 of the sample tube rack 10 of the upper part 102.

As illustrated in FIG. 8E, a gripper 150 having one or more gripper fingers 152 can be at least partly moved through the top side 20 of the sample tube rack 10 of the upper part 102 into an interior volume of the sample tube rack 10. Each of the gripper fingers 152 can be accommodated at least partly in one of the clearances 22 of the sample tube rack 10. To place a sample tube into the sample tube rack 10. The gripper fingers may be moved outwardly away from the vertical axis of the respective opening 14 once the sample tube is positioned in the correct height and/or depth in the sample tube rack 10 and/or the sample tube rack assembly 100. To pick a sample tube from the sample tube rack 10, the gripper fingers 152 may be moved towards each other while they are at least partly arranged in the clearances 22 and/or in the interior volume of the sample tube rack 10.

Figure 9:
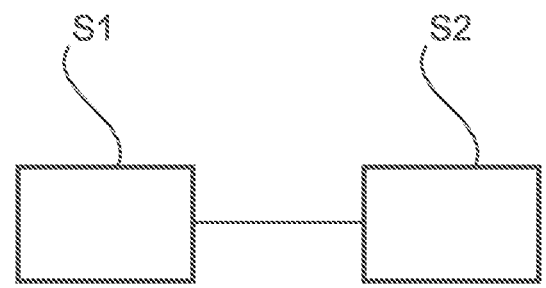
FIG. 9 shows a flow chart illustrating steps of a method for inserting a sample tube into and/or removing a sample tube from a sample tube rack according to an exemplary embodiment.

FIG. 9 shows a flow chart illustrating steps of a method for inserting a sample tube into and/or removing a sample tube from a sample tube rack 10 and/or a sample tube rack assembly 100 according to an exemplary embodiment. If not stated otherwise, the sample tube rack 10 and/or the sample tube rack assembly 100 comprises the same elements, features and/or functions as described with reference to the foregoing figures. Specifically, the method of FIG. 9 is also illustrated in FIG. 8E.

In a first step S1, a gripper 150 having a plurality of gripper fingers 152 for holding the sample tube is moved towards the bottom surface 12 of the sample tube rack 10, such that each gripper finger 152 is at least partly arranged in one of the clearances 22 formed between the guiding elements 16, 16' of the sample tube rack 10.

In a further step S2, the sample tube is inserted into the tube compartment 24 or removed from the tube compartment 24 based on actuating the gripper 150 and/or the gripper fingers 152 of the gripper 150.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art and practicing the claimed invention, from a study of the drawings, the disclosure, and the appended claims.

In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A sample tube rack for receiving at least one sample tube, the sample tube rack comprising:
    a bottom surface;
    a plurality of openings arranged in an array in the bottom surface and configured to receive sample tubes, and
    a plurality of guiding elements on the bottom surface, wherein along a row and/or along a column of the array, the plurality of openings and the plurality of guiding elements are alternately arranged, and
    wherein guiding elements of the plurality of guiding elements which are arranged between two neighboring openings in a row or between two neighboring openings in a column of the array comprise at least two restraining elements arranged on two opposite sides of the respective guiding element and are free of restraining elements on sides perpendicular to the two opposite sides;
    at least two guiding elements of the plurality of guiding elements are arranged on the bottom surface adjacent to each of the plurality of openings;
    wherein each of the plurality of guiding elements has a columnar shape and protrudes substantially parallel to a vertical axis of the plurality of openings from the bottom surface towards a top side of the sample tube rack;
    wherein the at least two guiding elements of the plurality of guiding elements are arranged at different positions around each of the plurality of openings, such that a tube compartment for receiving a sample tube is formed by the plurality of guiding elements and the plurality of openings, each of the plurality of guiding elements comprising at least one restraining element configured for holding a sample tube in the tube compartment, and wherein at least a part of each restraining element extends from a respective guiding element towards the vertical axis of a respective opening;
        wherein each of the plurality of guiding elements are spaced apart from each other along a perimeter of each of the plurality of openings, thereby forming at least two clearances between each of the plurality of guiding elements along the perimeter of each of the plurality of openings; and
        wherein each clearance is configured for receiving a gripper finger of a gripper for inserting a sample tube into and/or removing a sample tube from the tube compartment.

2. The sample tube rack according to claim 1,
    wherein each clearance extends from the bottom surface to the top side of the sample tube rack; and/or
    wherein each clearance is open to the top side of the sample tube rack.

3. The sample tube rack according to claim 1, wherein each of the plurality of guiding elements has an elongated shape.

4. The sample tube rack according to claim 1, wherein each of the plurality of guiding elements is configured for aligning and/or laterally holding a sample tube in a partial region of the sample tube; and/or wherein each of the plurality of guiding elements is configured for laterally contacting a partial region of the sample tube.

5. The sample tube rack according to claim 1,
    wherein an end of each of the plurality of restraining elements is attached to a top end of a respective guiding element, which top end is arranged opposite to the bottom surface; and/or
    wherein at least a part of each of the plurality of restraining elements extends from a top end of a respective guiding element towards the bottom surface and towards the vertical axis of a respective opening, such that at least a part of each restraining element is inclined to the vertical axis of the plurality of openings.

6. The sample tube rack according to claim 1, wherein at least three of the plurality of guiding elements, are arranged around the at least one opening of the plurality of openings and are spaced apart from each other along perimeter of the at least one opening.

7. The sample tube rack according to claim 1,
wherein guiding elements of the plurality of guiding elements, which are arranged at a perimeter of the array, are at least partly attached to a side wall of the sample tube rack.

8. The sample tube rack according to claim 1 in combination with a transport system for transporting and/or distributing sample tubes to one or more processing sites.

9. The sample tube rack according to claim 1, comprising a merged clearance between four of the plurality of openings that are directly neighboring, wherein the bottom surface in the merged clearance is free of openings for sample tubes.

10. The sample tube rack of claim 1, wherein, for each opening of the plurality of openings:
at least four guiding elements of the plurality of guiding elements are arranged equidistant from each other on the bottom surface adjacent to each respective opening; and
each of the at least four guiding element arranged on the bottom surface adjacent to each respective opening has a restraining element arranged on a side of that respective guiding element disposed toward that respective opening.

11. The sample tube rack of claim 1, wherein:
each guiding element of the plurality of guiding elements which is disposed between two neighboring openings in a row of the array has restraining elements on sides of respective guiding elements which face neighboring elements in the same row of the array; and
each guiding element of the plurality of guiding element which is disposed between two neighboring openings in a column of the array has restraining elements on sides of respective guiding elements which face neighboring elements in the column of the array.

12. A sample tube rack assembly, the assembly comprising:
an upper part with at least one of the sample tube rack of claim 1; and
a lower part comprising a supporting surface with at least one supporting position for supporting the sample tube;
wherein the upper part is arranged on top of the lower part, such that the at least one opening of the at least one sample tube rack of the upper part is substantially aligned with the at least one supporting position of the lower part.

13. The sample tube rack assembly according to claim 12, further comprising:
an intermediate part comprising an intermediate surface with at least one intermediate opening;
wherein the intermediate part is arranged and/or stacked between the upper part and the lower part, such that the at least one opening of the plurality of openings of the at least one sample tube rack of the upper part is aligned with the at least one intermediate opening of the intermediate part and with the at least one supporting position of the lower part.

14. The sample tube rack assembly according to claim 13, wherein the intermediate part and the upper part differ from another in construction.

15. A method for inserting a sample tube into and/or removing a sample tube from a sample tube rack, comprising:
moving a gripper having a plurality of gripper fingers for holding the sample tube towards a bottom surface of the sample tube rack, such that each gripper finger is at least partly arranged in one of a plurality of clearances formed between guiding elements of the sample tube rack; and
inserting the sample tube into a tube compartment or removing the sample tube from the tube compartment based on actuating the gripper and/or the gripper fingers of the gripper;
wherein the sample tube rack comprises
a bottom surface comprising:
a plurality of openings arranged in an array in the bottom surface and configured to receive sample tubes, and
a plurality of the guiding elements, wherein along a row and/or along a column of the array, the openings and the guiding elements are alternately arranged,
wherein the guiding elements of the plurality of guiding elements which are arranged between two neighboring openings in a row or between two neighboring openings in a column of the array comprise at least two of the restraining elements arranged on two opposite sides of the respective guiding element and are free of restraining elements on sides perpendicular to the two opposite sides;
at least two guiding elements of the plurality of guiding elements are arranged on the bottom surface adjacent to each of the plurality of openings;
wherein each of the plurality of guiding elements has a columnar shape and protrudes substantially parallel to a vertical axis of the plurality of openings from the bottom surface towards a top side of the sample tube rack;
wherein the at least two guiding elements of the plurality of guiding elements are arranged at different positions around each of the plurality of openings, such that the tube compartment for receiving a sample tube is formed by the plurality of guiding elements and the plurality of openings each of the plurality of guiding elements comprising at least one restraining element configured for holding a sample tube in the tube compartment, and wherein at least a part of each restraining element extends from a respective guiding element towards the vertical axis of a respective opening;
wherein each of the plurality of guiding elements are spaced apart from each other along a perimeter of each of the plurality of openings, thereby forming at least two clearances between each of the plurality of guiding elements along the perimeter of each of the plurality of openings;
wherein each clearance is configured for receiving the gripper finger of the gripper for inserting the sample tube into and/or removing the sample tube from the tube compartment.

16. The method of claim 15, wherein the sample tube rack is part of a sample tube rack assembly, the sample tube rack assembly comprising:
an upper part with at least one of the sample tube rack; and
a lower part comprising a supporting surface with at least one supporting position for supporting the sample tube;
wherein the upper part is arranged on top of the lower part, such that the at least one opening of the at least one sample tube rack of the upper part is substantially aligned with the at least one supporting position of the lower part.

17. The sample tube rack of claim 1, wherein a bottom end of each of the plurality of guiding elements is arranged on the bottom surface and a top end of each of the plurality of guiding elements opposite to the bottom end of the respective guiding element extends toward the top side of the sample tube rack.

18. The method of claim 15, wherein:
each gripper finger has a bottom tip, wherein, for each gripper finger, the bottom tip of that gripper finger is closer to the bottom surface of the sample tube rack than any other portion of that gripper finger;

moving the gripper towards the bottom surface of the sample tube rack, such that each gripper finger is at least partly arranged in one of the plurality of clearances formed between the plurality of guiding elements of the sample tube rack comprises moving the gripper to a position wherein, for each gripper finger:

the bottom tip of that gripper finger is separated from a closest point on the bottom surface of the sample tube rack by a distance which is less than a distance separating the closest point on the bottom surface of the sample tube rack from the top side of the sample tube rack.

* * * * *